United States Patent [19]

Reagan et al.

[11] Patent Number: 4,781,818

[45] Date of Patent: Nov. 1, 1988

[54] NON CATALYTIC SOLID MULLITE/CRYSTALLINE SILICA MATERIAL AND USE THEREOF

[75] Inventors: William J. Reagan, Englishtown; David W. White, Middletown; William R. Schultz, Highland Park; L. Alan Jarnagin, Millington, all of N.J.

[73] Assignee: Engelhard Corporation, Menlo Park, N.J.

[21] Appl. No.: 147,108

[22] Filed: Jan. 21, 1988

Related U.S. Application Data

[63] Continuation of Ser. No. 945,221, Dec. 19, 1986, abandoned, which is a continuation of Ser. No. 682,962, Dec. 18, 1984, abandoned.

[51] Int. Cl.$^4$ .................................... C10G 25/00
[52] U.S. Cl. .................................. 208/251 R; 208/27; 208/120; 208/127; 208/299; 208/52 CT; 208/300; 208/305; 502/27; 502/263; 502/80; 502/407; 423/327
[58] Field of Search ............ 208/120, 251 R; 502/27, 502/80, 407; 423/327

[56] References Cited

U.S. PATENT DOCUMENTS

| | | | |
|---|---|---|---|
| 2,582,254 | 1/1952 | Hunter | 502/27 |
| 3,024,203 | 3/1962 | Strecker | 502/27 |
| 3,224,961 | 12/1965 | Erickson et al. | 208/251 R |
| 3,409,541 | 11/1968 | Flanders et al. | 208/251 R |
| 3,647,718 | 3/1972 | Haden, Jr. et al. | 502/68 |
| 4,002,557 | 1/1977 | Owen et al. | 208/251 R |
| 4,243,514 | 1/1981 | Bartholic | 208/251 R |
| 4,263,128 | 4/1981 | Bartholic | 208/251 R |
| 4,311,579 | 1/1982 | Bartholic | 208/251 R |
| 4,311,580 | 1/1982 | Bartholic | 208/251 R |
| 4,328,091 | 1/1982 | Bartholic | 208/251 R |
| 4,374,021 | 2/1983 | Bartholic | 208/251 R |
| 4,427,538 | 1/1984 | Bartholic | 208/251 R |
| 4,461,845 | 7/1984 | Dessau et al. | 502/27 |
| 4,628,042 | 12/1986 | Speronello | 502/263 |

FOREIGN PATENT DOCUMENTS

| | | | |
|---|---|---|---|
| 0072653 | 2/1983 | European Pat. Off. | 208/251 R |
| 2117394 | 10/1983 | United Kingdom | 208/25 R |

Primary Examiner—A. M. S. Sneed
Assistant Examiner—Helane Myers
Attorney, Agent, or Firm—Inez L. Moselle

[57] ABSTRACT

Improved noncatalytic nonreactive alumina-silica solid for removing carbonaceous and metallic contaminants including nickel and vanadium from hydrocarbon feedstock by short term, high temperature contact comprises mullite and crystalline silica. In the decarbonizing and demetallizing process, impurities are deposited on the particles of the solid and the major portion of the feedstock is vaporized. After burning carbonaceous deposit from the particles, the hot particles containing nickel and vanadium are recycled into contact with incoming charges of contaminated feedstock. Periodically metals are removed from coke-depleted particles by extraction with a mineral acid at elevated temperature without dissolving or otherwise destroying the alumina-silica particles. The particles are then reintroduced into the system. The particles comprising mullite and crystalline silica are obtained by calcining particles of high purity kaolin or kyanite under controlled conditions to assure substantial conversion of silica content of the clay or kyanite to a mixture of mullite and crystalline silica. Optionally, small amounts of acid insoluble alumina are also present in the particles.

17 Claims, 2 Drawing Sheets

FIG. 1
EXTRACTION OF METALS FROM MICROSPHERES CONSISTING OF CALCINED CLAY

FIG. 2

NON CATALYTIC SOLID MULLITE/CRYSTALLINE SILICA MATERIAL AND USE THEREOF

This is a continuation of application Ser. No. 945,221 filed on Dec. 19, 1986 now abandoned which is a continuation of application Ser. No. 682,962 filed Dec. 18, 1984, now abandoned.

RELATED APPLICATIONS

This application is related to commonly assigned patent application Ser. No. 505,650 now abandoned, filed June 20, 1983 in the name of Barry K. Speronello.

FIELD OF THE INVENTION

The invention relates to novel shaped mullite/crystalline silica particles, such as small rounded particles (microspheres). The invention relates also to procedures for manufacturing such particles by calcining high purity clay or kyanite, in the form of shaped preformed bodies, to a temperature at which mullite and free silica are formed, the temperature and time being sufficient to assure that the resulting free silica is present as a crystalline phase (e.g., tridymite and/or cristobalite).

The invention relates also to the use of the shaped mullite/crystalline silica particles as the essentially noncatalytic contact material used in the process for upgrading petroleum feedstocks contaminated with Conradson Carbon residues and metal contaminants, such as resids or heavy crudes, by the technological innovation known in the petroleum industry as the Asphalt Residual Treatment or ART SM process. This process is described in the literature as "selective vaporization". In particular this embodiment of the invention relates to improvements which result in decreased formation of agglomerates of contact material during service. The invention relates also to improvements in the ART process which involve the inclusion of a direct acid leach of metals deposited on used contact material and recirculation of the leached contact material to an ART unit, with optional recovery of one of more metals from the acid extraction process.

BACKGROUND OF THE ART PROCESS

1. Selective Vaporization Process

The Asphalt Residual Treating (ART) Process is a decarbonizing and demetallization process that has been developed to treat residual stocks and heavy crudes for the removal of contaminants. The process is described in numerous publications, including "The ART Process Offers Increased Refinery Flexibility", R. P. Haseltine et al, presented at the 1983 NPRA Conference in San Francisco. See also U.S. Pat. No. 4,263,128 to Bartholic. The contents of the aforementioned publication and patent are incorporated herein by cross-reference thereto.

The process is a noncatalytic technological innovation in contaminant removal and will typically remove over 95% of the metals, essentially all the asphaltenes and 30% to 50% of the sulfur and nitrogen from residual oil while preserving the hydrogen content of the feedstock. This provides greatly improved cost-effectiveness by producing less unwanted by-products and consuming less energy than competing processes. The ART process also enables the subsequent conversion step in residual oil processing to be accomplished in conventional downstream catalytic processing units.

The ART process utilizes a solid particulate contact material which selectively vaporizes the valuable, lower molecular weight and high hydrogen content components of the feed. The contact material is substantially catalytically inert and little if any catalytic cracking occurs when the process is carried out under selected conditions of temperature, time and partial pressure.

Heavy metals are deposited on the contact material and removed. High molecular weight asphaltenes are also deposited on the contact material, some asphaltenes being converted to lighter products.

The ART process is adapted to be carried out in a continuous heat-balanced manner in a unit consisting primarily of a contactor, a burner and an inventory of recirculating fluidizable contact material. Chargestock is contacted with particles of hot fluidizable contact material for a short residence time in the contactor. In the contactor, the lighter components of the feed are vaporized; asphaltenes and the high molecular weight compounds, which contain metals, sulfur and nitrogen contaminants, are deposited on the particles of the contact material. The metals invariably include vanadium and nickel. Some of the asphaltenes and high molecular weight compounds are thermally cracked to yield lighter compounds and coke. The metals that are present, as well as some of the sulfur and nitrogen bound in the unvaporized compounds, are retained on particles of contact material. At the exit of the contacting zone, the oil vapors are rapidly separated from the contact material and then immediately reduced in temperature to minimize incipient thermal cracking of the products. The particles of contact material, which now contain deposits of metals, sulfur, nitrogen, and carbonaceous material are transferred to the burner where combustible contaminants are oxidized and removed. Regenerated contact material, bearing metals but minimal coke, exits the burner and circulates to the contactor for further removal of contaminants from the charge stock. The selective vaporization process can also be carried out in so-called moving bed mode using pelleted particles of contact material, for example pellets having a diameter of 0.145–0.157 inches and a length of 0.1 to 0.3 inches. See U.S. Pat. No. 4,435,272 to Bartholic et al.

In practice, the metals level of contact material in the system is controlled by the addition of fresh contact material and the removal of spent contact material. A high metals level can normally be maintained without detrimentally affecting performance.

Because the contact material is essentially catalytically inert, very little molecular conversion of the light gas oil and lighter fractions takes place. Therefore the hydrogen content of these streams is preserved. In other words, the lighter compounds are selectively vaporized. The molecular conversion which does take place is due to the disproportionation of the heavier, thermounstable compounds present in the residual feedstock.

The hydrogen content of the coke deposited on the contact material is typically less than four percent. Coke production is optimally equivalent to 80% of the feedstock Conradson Carbon Residue content. Heat from the combustion of coke is used internally within the ART system. Surplus heat may be recovered as steam or electric power. No coke product is produced. In contrast, delayed and fluid cokers yield a coke product equivalent to 1.3 to 1.7 times the Conradson Carbon residue.

Generally, metals accumulated on the contact material used in the ART process tend to be less active in forming coke than metals accumulated on cracking catalyst. Thus, the ART process is able to operate effectively when accumulated metals are present on the contact material at levels higher than those which are generally tolerable in the operation of FCC units. For example, the process has operated effectively when combined nickel and vanadium content substantially exceeded 2% based on the weight of the contact material.

Early in the development of the ART process, criteria for suitable contact material were established. See U.S. Pat. No. 4,263,128. These included low activity for catalytic cracking, below 20% conversion by the microactivity(MAT) test, and low surface area, generally below 20 m$^2$/g (BET) and preferably in the range of 5 to 15 m$^2$/g, and high resistance to attrition. Reference is made to the following U.S. patents of which David B. Bartholic is the inventor: U.S. Pat. Nos. 4,243,514; 4,263,128; 4,309,274; 4,309,274; 4,311,579; 4,311,580; 4,325,809; 4,374,021; and 4,427,538. The aforementioned patents express a preference for microspheres of calcined kaolin clay, in particular microspheres obtained by slurrying naturally-occurring hydrated kaolin clay in water, spray drying to form microspheres and calcining the microspheres at a temperature and for a time sufficient for the clay to undergo the characteristic kaolin exotherm. The resulting microspheres are further characterized in the aforementioned patents as having surface areas in the suitable range, with most of the porosity being contributed by pores having diameters in the range of 150 to 600 Angstrom units. A list of other contact materials appears in U.S. Pat. No. 4,423,514 (supra) at column 5, line 15 to 23. Consistent with the expressed preference for using microspheres composed of kaolin calcined to undergo the exotherm has been the use of such microspheres in commercial practice of the ART process. The ability of such microspheres to remove over 90% of the metal contaminants in heavy feedstocks and provide valuable syncrudes while minimizing catalytic cracking was confirmed. It has been reported, however, that on occasion the microspheres tended to coalesce or agglomerate when the particles of contact material were used over an extended period of time. Agglomeration or coalescence was reported to occur in standpipes, cyclone diplegs and areas of stagnant flow, resulting in loss of fluidization and flowability. See U.S. Pat. No. 4,469,588, Hettinger et al. Two hypotheses, both related to the effect of metals, were advanced. A first was that microspheres of calcined clay were insufficiently porous to soak up the metals. The recommendation that flowed from this hypothesis was to use microspheres that were more porous, in particular microspheres that had a porosity of at least 0.4 cc/g. See U.S. Pat. No. 4,469,588. A related concept underlies the aspect of the invention described in Ser. No. 505,650 now abandoned of Speronello, supra, which proposes the conversion clay into porous mullite by calcining clay past the exotherm to form mullite and free silica, preferably amorphous soluble silica, and then leaching the silica. Leaching of silica results in the creation of pores. The other hypothesis was that vanadium was forming compounds which had relatively low melting points and therefore were in liquid condition during regeneration. The recommendation that flowed from this suggestion was simply to provide means to react vanadium compounds with inorganic compounds such as, for example, those of titanium, calcium, magnesium or rare earth, to form vanadium compounds having higher melting points. See U.S. Pat. No. 4,469,588 (Hettinger et al.)

A desirable feature of an improved selective vaporization process would be the removal of nickel and vanadium from spent contact material. This would allow the reuse of such reactivated contact material in the selective vaporization process. This feature would result in improved process economics. The overall economics of removing metals from spent contact materials for reuse in the process are dependent on the fraction of metals removed and the complexity of the metals removal step. This would also allow the operation of a plant in which any material not generated for sale can be disposed of in land fill.

2. Thermal Conversion of Clay

Kaolin clays are naturally-occurring hydrated aluminum silicates of the approximate formula $Al_2O_3 \cdot 2SiO_2 \cdot XH_2O$, wherein X is usually 2. Kaolinite, nacrite, dickite and halloysite are species of minerals in the kaolin clay group. It is well known that when kaolin clay is heated in air that a first transition occurs at about 550° C. associated with an endothermic dehydroxylation reaction. The resulting material is generally referred to as metakaolin. Metakaolin persists until the material is heated to about 975° C. and begins to undergo an exothermic reaction. This material is frequently described as kaolin which has undergone the characteristic exothermic reaction. Some authorities refer to this material as a defect aluminum-silicon spinel or as a gamma alumina phase. See Donald W. Breck, ZEOLITE MOLECULAR SIEVES, published by John Wiley & Sons, 1974, pages 314–315. On further heating to about 1050° C., mullite begins to form. The mullitization reaction that takes place when kaolin clay is utilized as the sole source of silica and alumina may be represented by the following equation where the approximate chemical formula for kaolin (without the water of hydration) is given as $Al_2O_3 \cdot 2SiO_2$, and the formula for mullite is $3Al_2O_3 \cdot 2SiO_2$:

$$3(Al_2O_3 \cdot 2SiO_2) \rightarrow 3Al_2O_3 \cdot 2SiO_2 + 4SiO_2.$$

The term represented by $4SiO_2$ is the free silica generated as a result of the conversion to mullite. The extent of conversion to mullite is dependent on a time-temperature relationship and the presence of mineralizers, as is well known in the art. The free silica can be amorphous or crystalline and this will also depend on calcination temperature and time and the presence of mineralizers. A high purity kaolin clay can theoretically be converted into about 64% mullite on a weight basis. The free silica formed when kaolin clay is thermally converted into mullite is amorphous when calcination takes place at about 1100° C. Upon heating to temperatures in excess of about 1260° C. silica crystallizes and the amount of silica detectable by X-ray increases with temperature and time. The crystalline silica may be tridymite or cristobalite or both.

Mullite is widely used in ceramic applications such as in the manufacture of refractory grains. For these applications, dense impervious products are needed and porosity is undesirable. See, for example, U.S. Pat. No. 3,462,505.

It is also well known that the reactivity of kaolin clay changes as it undergoes these thermal transitions. See the Breck publication supra at page 315.

THE INVENTION

The instant invention has its genesis in part in attempts to provide cost-effective technology to remove deposited metals, notably nickel and vanadium, from spent contact material that is withdrawn periodically from ART units and is replaced by fresh material. Early attempts to remove large amounts of both vanadium and nickel using acid extraction were plagued by co-extraction of significant amounts of alumina from the contact material formed by calcining microspheres of kaolin clay through the exotherm. Removal of alumina in more than minimal amounts resulted in an undesirable increase in surface area. Those knowledgeable in the art of catalytic cracking are aware that increases in surface area are generally associated with increased cracking activity. Also, when removal of appreciable amounts of alumina took place, the attrition-resistance of the microspheres decreased or, in some cases, the microsphere-form was actually destroyed. In either case, the metal-depleted (extracted) microspheres would be of limited, if any, use as a substitute in whole or in part for fresh charge of contact material. In addition to the aforementioned problems, the presence of alumina in the acid leachate resulted in difficulties in bringing about the subsequent separate recovery of nickel and vanadium from the leachate.

Contemporaneously with investigations directed to provide contact materials which responded satisfactorily to simple acid extraction for metals removal, attempts were also made to develop contact material that would be more resistant to agglomeration. The efforts were thwarted by the unexpected finding that increases in porosity did not necessarily result in decreases in tendency to agglomerate. To the contrary, it was found that some material meeting the criterion for resistance to agglomeration were very low in total porosity. Some materials exhibited promising performance with regard to agglomeration resistance after one or two acid regeneration treatments but disintegrated physically when they were subjected to additional cycles of metal loading and regeneration by acid extraction.

The resolution to the solutions of these seemingly unrelated problems merged with the unexpected discovery that by providing alumina-silica contact material composed predominantly of mullite and crystalline silica, both problems were fortuitously solved. This was unexpected because the materials that formed the basis for these discoveries had very low porosity, less than 0.1 cc/g. Substantially all of the porosity was contributed by macro-sized pores, i.e., pores having diameters larger than 1000 Angstrom units. We do not wish to be bound to any theory or hypothesis regarding the multiple benefits achievable by providing contact particles composed predominantly of crystalline mullite and crystalline silica. We do believe that such contact particles minimize agglomeration because they contain little if any silica that is not contained in crystalline form, i.e., mullite and crystalline silica. Consequently, less silica is available in chemically reactive form. Since the predominating components of the binding agent in agglomerates is believed to be mainly silica, sodium and vanadium rich crystalline phases, less binding material will be formed under the hydrothermal condition prevailing in an ART unit. We also believe that by reducing the content of reactive silica, less vanadium and nickel occur as silicate compounds or complexes which are difficult to dissolve with strong mineral acids. Consequently, a greater fraction of both metals can be removed by acid extraction.

Thus, in one aspect, the invention resides in providing improved particulate contact material characterized by the presence of both mullite and free silica (silica in addition to the silica content of the mullite component), an appreciable amount of the free silica being present in crystalline form (tridymite, cristobalite or both). Most of the pores are in the macropore size range and there is minimal micro- and meso-porosity. The contact particles may also contain small amounts of alumina not present in mullite, such alumina being a crystalline form resistant to acid.

The instant invention results in the following improvements in the ART process:

1. Contact particles which in fresh and regenerated (acid extracted) condition have acceptable resistance to attrition and low catalytic activity.

2. Contact particles which, when metal-loaded during service in ART units, can be repeatedly subjected to direct acid treatment (without complex, expensive pretreatment) for effective removal of both nickel and vanadium without appreciable co-extraction of alumina.

3. Contact particles which have improved resistance to agglomeration in both fresh and acid-extracted conditions. In effect, the microspheres can be repeatedly used, extracted and recirculated in an ART unit without imparting undesirable cracking activity or agglomerating tendency or causing the microspheres to soften appreciably or disintegrate during or after the acid treatment.

4. Contact particles which can be prepared from readily available mineral material.

In another aspect, the invention provides a process for forming novel contact material. In accordance with the invention, clay thermally convertible to mullite and free silica (or kyanite, which is also convertible to mullite and silica) is first mixed with a fugitive binder, preferably water, and formed into particles of desired size and shape, preferably microspheres formed by spray drying. The resulting preforms are then fired (calcined) under conditions of time and temperature conducive to substantial conversion to mullite and also sufficient to convert silica resulting from the decomposition of clay or kyanite into an appreciable level of crystalline silica.

Still another aspect of the invention comprises a process for preparing premium products from a charge of petroleum hydrocarbon feedstock having a substantial Conradson Carbon residue and metals content including vanadium and nickel which comprises contacting the feedstock in a decarbonizing and demetallizing zone with particles of solid contact material comprising mullite and crystalline silica, the particles of solid contact mineral having a low microactivity for catalytic cracking, at low severity, including a temperature of at least 482° C., for a period of time less than that which induces substantial thermal cracking of the feedstock; at the end of such period of time separating from the solid contact material the vaporized major fraction of the feedstock which is a decarbonized and demetallized volatilized hydrocarbon fraction of reduced Conradson Carbon residue and metals content as compared with the feedstock; reducing the temperature of the separated fraction to a level below that at which substantial thermal cracking takes place; subjecting the solid particles of contact material, now containing metals and carbonaceous matter, to contact with air at elevated temperature in a separate burning zone to remove combustible deposit and heat the solid; and recycling at least a portion of said particles of fluidizable solid from the burning zone to the decarbonizing zone for further decarbonizing and demetallization of the feedstock. Preferably, metal-laden particles which are periodically withdrawn from the burner are leached with a solution of a mineral acid to remove (extract) major proportions, preferably at least 80% by weight, and most preferably at least 90% by weight, of both nickel and vanadium and the particles having a reduced metal content are recovered and reintroduced into the burner for recycle to the decarbonizing and demetallizing zone. Preferred acids used to remove nickel and vanadium are hydrochloric and sulfuric which are used at elevated temperature.

DESCRIPTION OF PREFERRED EMBODIMENTS

Clay or kyanite to be processed into mullite/crystalline silica should be high in purity. Generally these minerals should be low in iron, titania, alkalies, and free alumina. Typically, the material should contain at least 95% by weight (volatile free basis) of silica plus alumina. Presently preferred are high purity, water-washed kaolinitic clays from deposits of the type found in Georgia, such clays typically having a $SiO_2/Al_2O_3$ molar ratio of about 2/1, and containing, on a volatile-free weight basis, less than 2% iron (measured as $Fe_2O_3$) and less than 1% total alkali and alkaline earth oxides. Many clays, for example, the smectites (e.g., bentonites), attapulgites, and illites are high in alkaline earth and alkali and some clays and kyanites contain high levels of iron e.g., more than 3% expressed as $Fe_2O_3$ on a volatile-free weight basis. Georgia kaolins of both the hard and soft types have been used successfully.

The term hard clay as used in this specification and in the claims, means kaolin clays such as the sedimentary clays mined in the middle and east Georgia kaolin districts. These clays are distinguished from the more commonly known and used soft kaolin clays in a number of ways as summarized, for example, in table form at page 29 of "Field Conference, Kaolin, Bauxite, Fuller's Earth, Annual Meeting of the Clay Minerals Society, 1979", the disclosure of which is incorporated by reference herein. Soft kaolin clays usually have a white or sometimes orange tint and display the characteristics of fracturing smoothly and breaking easily into friable angular fragments when dried, the fragments displaying smooth, flat or sub-conchoidal surfaces. In contrast, most but not all hard kaolin clays have a gray tinge or coloration and are further characterized by breaking into irregularly shaped fragments having rough surfaces. The hard kaolin clays usually have a higher dry strength than do soft kaolin clays at the same moisture content, which accounts for the nomenclature "hard" kaolin. Further, hard kaolin clays as a class are finer than the soft kaolin clays. For example, whereas about 50% by weight of the particles of a typical hard kaolin crude clay are finer than 0.4 micron, about 50% by weight of the particles of a typical soft kaolin crude clay are finer than 1.5 microns, as determined by conventional sedimentation procedures. Hard kaolin clays also commonly contain a significant iron content, typically about 1% by weight $Fe_2O_3$ whereas soft kaolin clays ordinarily contain an appreciably lesser quantity of iron compounds, for example, about 0.3% by weight $Fe_2O_3$.

Hard and soft kaolin clays are also distinguished from each other in Grim's "Applied Clay Mineralogy", 1962, McGraw-Hill Book Company, Inc., at pages 394 to 398 thereof, the disclosure of which is incorporated by reference herein. As mentioned in the Grim publication, hard kaolins are generally darker than soft kaolins. The Grim text also points out that the ultimate size of particles, i.e., the size of the particles in a well-dispersed clay pulp, of hard kaolin clays is significantly finer than those of soft kaolin clays. As described in the Grim text, a representative sample of hard kaolin clay had about 90% by weight of the ultimate size particles finer than 2 microns and about 60% by weight finer than ½ micron, the average particle size of typical hard clays being below ¼ micron. Soft kaolin crude clays in contrast, contain a substantial amount of particles coarser than 2 microns, with the average particle size of a representative papermaking soft kaolin clay being about 1 micron, with only a minor amount finer than ½ micron. Such particles generally differ from the finer particles in that the former are composed of a substantial proportion of stacks or booklets of hexagonal clay crystals. Still other stated differences in the Grim text between hard and soft clays are that hard kaolin clays tend to be less ordered (less well crystallized) than soft kaolin clays which therefore produce more sharply defined X-ray diffraction peaks, and the hard kaolin clays absorb less water than do soft kaolin clays.

The particle size distribution of the clay and its degree of agglomeration in the green bodies (i.e., the bodies obtained after forming into particles and prior to calcination) influence the hardness and structure of the calcined bodies. However, too much macroporosity may reduce the strength and attrition resistance of mullite/crystalline bodies. Therefore, the particle size and degree of agglomeration of clay used to produce crystalline/silica mullite particles is a compromise between maximum strength (i.e., minimum porosity) and some macroporosity. Clays with broad particle size distributions generally produce minimum porosity. An example of such a clay is ASP ® 900 hydrous kaolin, which contains particles up to 20 microns in diameter, an average particle size (weight basis) of ca. 1.5 microns, and about 25% by weight finer than 0.5 micron. Clays with a narrower particle size distributio do not pack as efficiently as clays having a broader particle size distribution, resulting in a greater quantity of macroporosity. An example of such a clay is ASP ® 400 hydrous kaolin, which contains particles up to 20 microns in diameter, an average particle size of ca. 5 microns and nothing <0.5 micron. A good compromise between these extremes, which results in less than about 0.1 cc/g of macroporosity in microspheres after calcination, is ASP ® 600 hydrous kaolin which contains nothing coarser than about 8 microns, has an average particle size of 0.9 micron and contains 35% <0.5 μm. (As used herein, all particle sizes of hydrous clays in the micron-size range are those determined by sedimentation and are therefore expressed as "equivalent spherical diameter" or "e.s.d." in conventional manner.)

A preferred source of hard clay is the coarse size fraction of a hard kaolin crude that is produced as a waste by-product stream in the commercial production of calcined low abrasion clay pigments from hard clay as described in U.S. Pat. No. 3,586,523 to Fanselow et al. This by-product stream arises when degritted hard clay crude is processed in centrifuges to recover a fine size fraction, typically 90% by weight finer than 1 micron, for subsequent charge to a calciner. Use of this by-product stream results in the utilization of virtually all of the degritted hard clay crude. Thus, the fine particle size fraction is employed to manufacture a high value calcined clay pigment having low abrasion. The pigment is substantially free of mullite. The remainder is employed to manufacture mullite/crystalline silica contact material.

Novel bodies of the invention consist of mullite and crystalline silica as essential ingredients. It is possible to produce bodies in which other substantially acid insoluble ingredients are also present. Examples of materials which are acid insoluble are certain crystalline forms of alumina, zirconia and silica. The source of added acid insoluble alumina, zirconia or silica can be a material which is normally acid soluble but is converted to a substantially acid insoluble form when the bodies are calcined. For example, alumina may be added as hydrous (soluble) alumina but will be converted to acid-insoluble form during calcination. Acid solubility is determined by refluxing the solid bodies with 35% $H_2SO_4$ solution for 1 hour using a weight ratio of 3 parts by weight acid solution to 1 part by weight of the solid bodies. When used as an ingredient in making the contact particles, alumina should be employed in a minor amount relative to the amount of clay. When alumina was mixed with kaolin clay in amount in excess of 15 parts by weight clay to 85 parts by weight clay to form microspheres, which were then calcined at 1115° C. to 1370° C., the resulting contact material agglomerated excessively. Microspheres which contained higher levels of added alumina (i.e., alumina added to clay in amounts of 45 to 75 parts by weight alumina to 55 to 25 parts by weight clay) had acceptable agglomeration performance when they were calcined at 1260° C. However, attrition resistance was impaired and progressively decreased when the level of alumina addition increased. Consequently, contact materials containing high levels of added alumina may be too soft or they may distintegrate during acid leaching. However, whether or not small amounts of alumina or other acid insolubles are also present, the bodies should contain no more than about 3%–5% by weight of combined oxides of alkali, alkaline earth and iron which may impair agglomeration resistance when present in excessive amount.

Forming can be conducted by conventional processes known in the art. Microspheres can be formed by spray drying a slurry of clay in water. In addition, a fugitive binder, such as polyvinyl alcohol, may be added to the slurry prior to spray drying to impart additional strength to the green microspheres prior to calcination. The preferred method to form microspheres is to prepare a slurry containing about 65 wt% of finely-divided, high purity hydrous kaolin clay (e.g., ASP ®600 clay), 0.3 wt % tetrasodium pyrophosphate, based on the weight of the clay, and water; and to spray dry the slurry using a spray dryer operating with a gas inlet temperature of about 540° C. and an outlet temperature of about 120° C. This results in microspheres which, prior to calcination, are typically characterized by 0.25 cc/g of macroporosity and essentially no meso- or microporosity. Particle size of the microspheres is in the range of about 20 to 150 microns. Average size is typically 60 to 90 microns.

Cylindrical shaped bodies (pellets) in the size ranges of about 1/32" to ½" diameter may conveniently be made by extruding a mixture of about 3 parts by weight high purity Georgia kaolin clay and 1 part by weight water using an auger-type extruder.

Other forming procedures can be utilized and other shapes, for example honeycombs, can be provided.

Control of calcination conditions (time and temperature) influences several properties, including:
1. the degree of clay conversion to mullite and free silica;
2. the conversion of free silica into required crystalline form;
3. the pore size, bulk density and surface area of the mullite/crystalline silica product.

Useful calcining temperatures are those which give conversion of clays to mullite plus free crystalline silica in practically useful times. Calcination temperature, using a specific piece of calcination equipment operating with a given residence time, will vary with the nature of the clay in the particles. This is demonstrated by data in illustrative examples which indicate that lower temperatures may be used with hard clay than with soft clay. Impurities in hard clay which act as fluxes may be responsible. Suitable calcination temperatures and times in conventional laboratory scale muffle furnaces are shown in illustrative examples. The temperature-time relationship has been found to vary using different muffle furnaces.

Results have been found to vary with the furnace used to calcine the particles. We believe that rotary calciners of the type described in U.S. Pat. No. 3,383,438 (Puskar et al) are suitable. However, such rotary calciners should be operated at temperatures above those mentioned in the U.S. Pat. No. 3,383,438 since the process described therein is intended to produce low abrasion calcined clay pigments which should be substantially free from mullite. Multiple hearth furnaces are also suitable. We believe that it is feasible to employ calciners in which the flame is not shielded from the particles undergoing calcination. Suitable conditions are readily determined for any given calciner. A suitable procedure is as follows. The theoretically achievable mullite content is calculated from the chemical composition of the green preformed particles. For example, using preformed microspheres consisting of high purity soft kaolin having a $SiO_2/Al_2O_3$ of 2.0, the maximum mullite content will be 64%. Using high purity kyanite, maximum mullite will be about 88%. The balance, in both cases will be free silica. X-ray patterns are obtained for samples calcined at various temperatures and times until the observed mullite content is close to the maximum theoretical mullite content. Generally, a mullite index above 50 should be obtained when calcining kaolin clay and an index above 45 when calcining kyanite. The progress of the development of crystalline silica can be followed by observing the height of the peak at d=4.11 Angstrom units. As mullite and crystalline silica phases develop, pore volume and surface area decrease and bulk density increases.

Fresh makeup of substantially inert contact material in an ART unit is dependent on the quantity of contaminant metals in the feed as well as the desired metals loading on the contact material. As an example, a 350 ton inventory ART unit processing 50,000 barrels per day of a feedstock containing 150 ppm of Ni+V would require a withdrawal and loss rate of 42 tons per day in order to maintain a 3 wt% loading of Ni+V on the circulating contact material. Daily withdrawal and loss of contact material approximates the addition of fresh contact material. Metal laden microspheres withdrawn from the burner of an ART unit typically contain about 0.5 to 0.01 wt.% carbon. Vanadium may be $V^{+5}$ or $V^{+4}$ oxidation states or both. The oxidation state of vanadium will vary with the level of excess oxygen in the burner.

Figure 2:
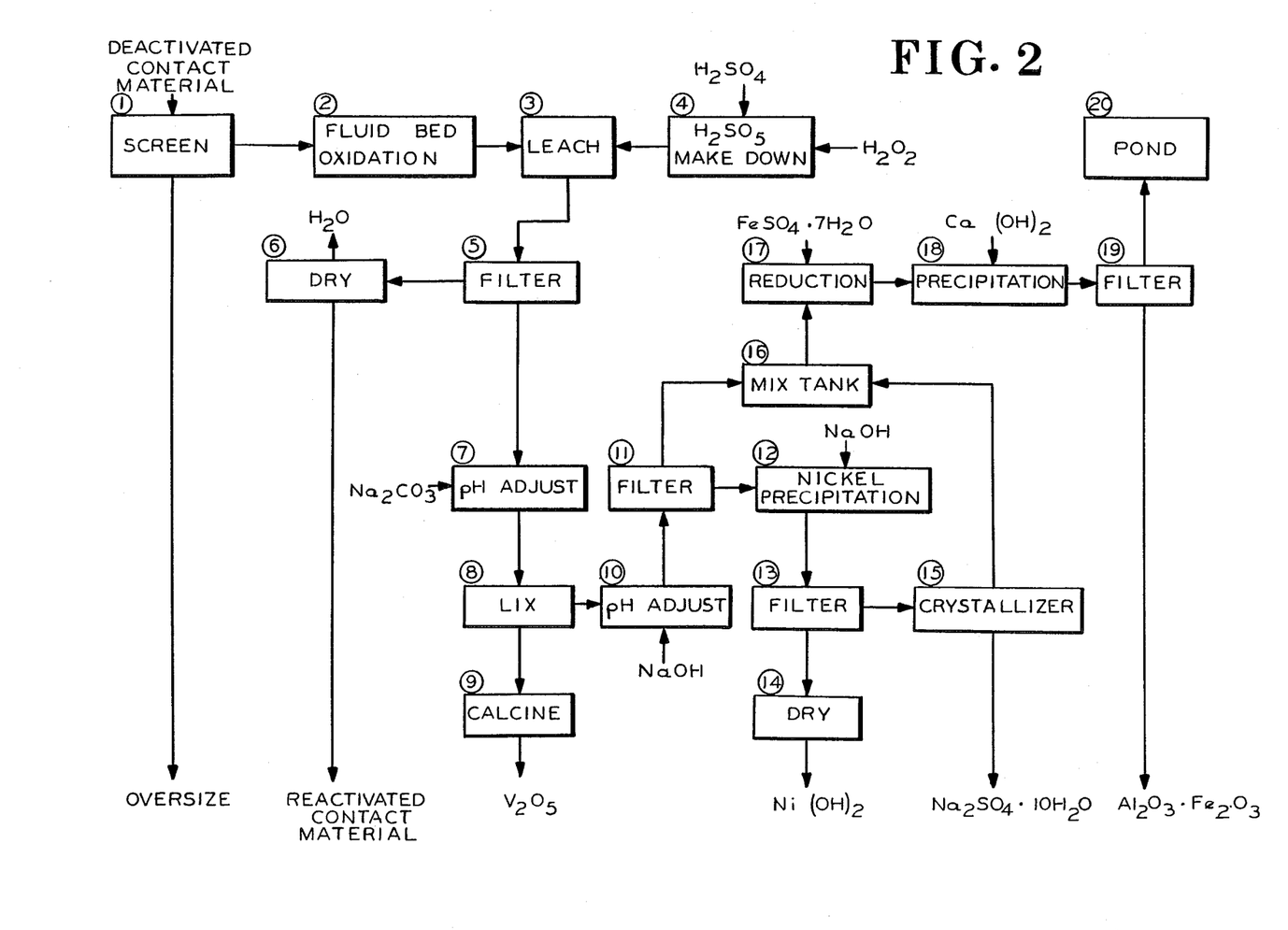
FIG. 2 is a flow scheme for a presently preferred method for the removal of metals from spent contact material by acid extraction and then separately recovering nickel and vanadium from the leachate.

The acid leach reactivation process shown in FIG. 2 is used to recover metals (nickel and vanadium) from spent contact material withdrawn from the burner of an ART unit and to produce reactivated contact material which is acceptable for reuse in the same or a different ART unit. The presently preferred process uses a high temperature mineral acid leach to remove the metals from the substrate material followed by filtration to separate the metals-containing solution from the contact material. The metals are purified in separate processing steps and can be sold as by-products. Hydrochloric acid and sulfuric acid extraction at temperatures in excess of about 88° C. have been used with success. A process flowsheet for the presently preferred process is shown in the figure and is described below.

The first process step (1) removes foreign and oversize material using a screening step. This oversize stream should be suitable for disposal in a standard land fill. However, provisions are made in the process for treatment of this material prior to disposal if required.

The second step (2) uses a high temperature (649°–871° C.) fluid bed contacting step in the presence of oxygen to remove residual carbon on the contact material and to oxidize the vanadium on the substrate to the +5 oxidation state. This oxidation is required if vanadium is eventually recovered as vanadium pentoxide in a high purity form. When vanadium is to be recovered as vanadyl sulfate or other vanadyl salts, step (2) may be omitted.

The contact material stream is then sent to the acid leach step (3) where it is contacted with hot sulfuric/-Caro's acid (monoperoxysulfuric acid), preferably in excess of about 88° C. The leach is conducted for about 30 minutes at a liquids to solids weight ratio of 1.5/1 to 3/1. The acid strength is 20–35 wt.%. The concentration of Caro's acid is determined as about 1 to 1-½ times the stoichiometric requirement for the reaction with the level of vanadium present. This acid is made down in a separate cooled tank (4) prior to use in the acid leach. Other means to oxidize $V^{+4}$ to $V^{+5}$ can be used, for example, electrolytic means, ozone treatment, inorganic salts such as chlorate salts, persulfates or other common oxidants known in the art. When vanadium is recovered by LIX treatment, we prefer to operate with a filtrate pH of 0.3 to 1, preferably about 0.8. The pH of the filtrate is affected by acid concentration and quantity.

The resulting slurry from the acid leach step is sent to a filter (5) with countercurrent wash system to separate the contact material from the metals in solution. The washed filter cake from the filter (5) is sent to a flash dryer (6) and dried to less than 1% moisture. This dried material is reactivated mullite/crystalline silica contact material product acceptable for reuse in the ART process. The filtrate from this step is sent to the metals recovery section of the process.

The metals recovery section of the process first removes vanadium from solution by LIX and then recovers nickel by selective precipitation. During vanadium recovery via LIX, the stream from the acid leach containing the filtrate and washings is pH adjusted from 0.8 to 2.5 in the LIX unit(8). In the LIX extraction this stream is contacted with an organic stream containing Alamine ®336 reagent in an organic diluent. The vanadium ions in the aqueous solution are exchanged with sulfate ions from the Alamine 336 organic stream. The vanadium barren aqueous stream is sent for further treatment described below. The vanadium laden organic stream is stripped to recover the vanadium as ammonium metavanadate and the organic is recycled within the LIX unit. The ammonium metavanadate is converted to produce >98% purity vanadium pentoxide black flake product in a two stage furnace system (9).

The vanadium barren aqueous stream from the LIX unit is sent to a pH adjustment tank (10) where the pH is raised to 4.5–5.0 resulting in the precipitation of aluminum, iron and small amounts of vanadium ions. This slurry is sent to filter (11) to recover the precipitate.

The filter cake is transferred to and treated in the disposal process section of the plant (16–20). The filtrate pH is raised to >8.0 in tank (18) to precipitate hydrate nickel oxide. The nickel precipitate is recovered in filter (13) and the filtrate from that step is evaporated in crystallizer (15) to recover sodium sulfate as a saleable by-product. The mother liquor from the crystallizer is combined in tank (16) with the alumina/iron precipitate for disposal. The remaining liquid filtrate containing essentially only sodium and calcium ions is sent to a lined process pond (20) for storage and reuse.

Representative microspherical contact materials of the invention made solely from high purity kaolin clay have a particle size distribution suitable for fluidization. Typically, average particle size is 60–90 microns. The particles should be substantially catalytically inert, i.e. the activity (conversion) should be below 20 and most preferably below 10 when tested by the MAT procedure. This procedure is described in European Patent Application No. 8410946.6. Bulk density is in the range of 1.1 to 1.5 g/cc. EAI is below 2%/sec., preferably below 1%/sec., and most preferably below 0.5%/sec. Pore volume is below 0.1 cc/g., for example, 0.01 to 0.09 cc/g. Pore volume typically occurs in pores with diameters larger than 1000 Angstrom units.

Agglomeration of the metals laden microspheres should be below 45, most preferably below 25, when determined by the test described hereinafter and expressed as Δ mean particle size. When refluxed with 35% $H_2SO_4$ for 1 hour at a liquid/solids ratio of 3/1, the alumina content should be reduced by no more than 5% by weight, preferably less than 3% by weight; the EAI of the microspheres should be substantially unchanged and the surface area should not increase above about $m^2/g$. Surface area of fresh microspheres is 20 $m^2/g$ or less, preferably lower and may be significantly less than 5 $m^2/g$, e.g., 1–3 $m^2/g$. Preferably, more than 80% deposited vanadium and nickel should be amenable to removal by extraction. Most preferably, removal of Ni and V is greater than 90%. Also, after the microspheres are used and contain deposits of nickel and vanadium, more than 80% and, most preferably, more than 90% of the nickel and vanadium should be amenable to removal by the acid reflux treatment while resulting in reactivated microspheres having physical and performance properties substantially the same as those of the fresh microspheres. A possible exception is that the resulting reactivated microspheres can increase slightly in surface area, preferably not to values over 20 m²/g. In the most preferred embodiment, the microspheres should be capable of undergoing repeated cycles, for example 3 or more cycles, of metal deposition, and reactivation by acid extraction of deposited metals to provide microspheres having physical and performance properties similar to those of the fresh microspheres.

DEFINITION AND DETAILS OF TEST PROCEDURES USED HEREIN

Identification of mullite crystal phase using X-ray powder diffraction

X-ray Powder Diffraction File, Card No. 15-776, Leonard G. Berry (Ed.), Joint Committee on Powder Diffraction Standards*, 1972 was used as the reference for the mullite X-ray powder diffraction pattern.

*1601 Park Lane, Swarthmore, Pa. 19081

Mullite index is measured by standard quantitative X-ray diffraction techniques relative to a nominally 100% mullite reference and using copper K-alpha radiation. A mullite index of 100 means that the mullite X-ray peak intensity for the peaks at 16°, 33°, 40°, and 60° have intensities equal to the 100% mullite reference.

Identification of Tridymite and Cristobalite Crystal Phases using X-ray Diffraction It is well known that quantitative analyses of cristobalite or tridymite phases by X-ray diffraction are difficult because of the influences of crystal strain and lack of a suitable standard. Qualitative phase identification can be obtained for cristobalite (Card. No. 11-695) and for tridymite (Card No. 18-1169 and Card No. 18-1170.)

Surface Area and volume of pores in range of 20-100 A

The surface area and the volume of pores having diameters in the range of 20-100 A were determined by conventional nitrogen adsorption and desorption techniques, respectively, using a Micromeritics ® Digisorb 2500 Automatic Multi-Gas Surface Area and Pore Volume Analyzer. Before being tested for surface area and volume of pores having diameters in the range of 20-100 A, the material being tested was first pretreated by heating under vacuum at about 250° C. for 16 hours.

Volume of pores in range of 100-20,000 A

The volume of pores having diameters in the range of 100-20,000 A was determined by a conventional mercury intrusion porosimetry technique using a scanning mercury porosimeter manufactured by Quantachrome Corp. The relationship between pore diameter and intrusion pressure was calculated using the Washburn equation and assuming a contact angle of 140° and a surface tension of 484 ergs/cm². Before being tested for volume of pores having diameters in the range of 100-20,000 A, the materials being tested were pretreated by heating them in air to about 350° C. for one hour and then cooling them in a dessicator. The term total pore volume as used in the specification and claims refers to pore volume contained in pores with diameters in the range of 100-20,000 Angstrom units.

Micropores:
Pores having diameters below 100 A as determined by nitrogen porosimetry.

Mesopores:
Pores having diameters in the range of 100 to 600 A by mercury porosimetry.

Macropores:
Pores having diameters in the range of 600 to 20,000 A by mercury porosimetry.

Engelhard Attrition (EAI) Test

Preferably, the microspheres used in the ART process are hard enough so that they do not attrit at an excessively high rate in the selective vaporization unit. For example, the Engelhard Attrition Index (the "EAI") of the microspheres used in the process preferably should be less than 2%/sec. preferably less than 1%/sec. and most preferably less than 0.5%/sec. The EAI is determined by the procedure described in the publication entitled "Engelhard Attrition Index." A copy of this publication has been deposited at the Library of the Technical Information Center, Engelhard Corporation, Edison, N.J. 08818 (Dewey Decimal No. 665.533 EC/EAI). Access to this Library, including this publication, can be obtained by writing to or telephoning the Manager of the Technical Information Center. In addition, a copy of this publication can be obtained by writing to: Director of Patents, Engelhard Corporation, Edison, N.J. 08818.

Bulk Density Determination

The apparent packing density or apparent bulk density of the frmed particles was determined by a procedure essentially the same as that described in ASTM Method D-4164-82 except that 100 ml of sample was used and 5000 taps were employed.

Static Agglomeration Test

A procedure was developed for testing the agglomeration tendency of materials under conditions that simulate conditions experienced by contact materials in a selective vaporization process of the type disclosed herein. In general, this procedure involves examining the change in the particle size distribution of a sample after it is exposed to steam at high temperature.

More particularly, the procedure that was developed comprises the following steps:

(a) a sample is screened by vibrating it with a Rotap apparatus on a 70 mesh screen for 20 minutes;

(b) 25 grams of the −70 mesh fraction of the sample is weighed;

(c) the particle size distribution of the 25 gram sample is determined by vibrating it with a Rotap apparatus for one minute on a screen assembly comprising 70, 100, 140, 200 and 270 mesh screens;

(d) the 25 gram sample is then placed into a porous, Inconel basket (or another porous basket, e.g., a porous, alumina basket) and the basket, containing the sample, is put into a furnace where 100% steam is passed through it for 48 hours and at a temperature of 871° C,;

(e) the 25 gram sample is removed from the basket and its particle size distribution is determined using the procedure described in (c) above;

(f) the mean and median particle size distributions of the 25 gram sample, before and after the steam treatment, are calculated, using the following formulas:

$$d\text{mean} = \frac{\Sigma(w \cdot d)}{\Sigma w}$$

$$d\text{median} = \text{antilog} \frac{[\Sigma(w \cdot \log d)]}{\Sigma w}$$

where dmean=mean particle size (in microns), dmedian=median particle size (in microns), w-weight of a particle size fraction, d=particle size, which is determined as shown below:

| Particle Size Fraction (Mesh) | Particle Size (Microns) |
|---|---|
| +70 | 250 |
| −70/+100 | 177 |
| −100/+140 | 125 |
| −140/+200 | 88 |
| −200/+270 | 63 |
| −270 | 44 |

(g) the difference between the mean and median particle sizes, before and after the steam treatment described in (d) above, are calculated by the following formulas:

Δ mean=dmean after steaming—dmean before steaming

Δ median=dmedian after steaming—dmedian before steaming

We believe that the values of Δ mean and Δ median for a material, which are obtained by the above procedure, provide a measure of the amount of agglomeration that will occur when that material is used in a selective vaporization process of the type described herein. In particular, we believe that materials having high Δ mean and Δ median values will exhibit a greater tendency to agglomerate in selective vaporization processes than will materials having lower Δ mean and Δ median values.

To determine the effect that the presence of vanadium has on the tendency of particles of contact material to agglomerate, different amounts of vanadium were deposited on samples. Then, those samples were tested to determine their Δ mean and Δ median values. Because nickel typically is also deposited on the particulate contact material used in selective vaporization processes of the type described herein, nickel was also deposited on the particles. Typically, samples are loaded with 8 wt% metals at a V/Ni weight ratio of 4/1.

Metal Impregnation Procedure

The metals-impregnation procedure used in illustrative examples is carried out by contacting the clean microspheres with dilute aqueous solutions containing nickel nitrate (Ni(NO$_3$)$_2$·6H$_2$O) and ammonium metavanadate. Metals are applied to the microspheres in a V/Ni weight ratio of 4/1. An application of 9.16 grams of nickel nitrate in 35 ml of water and ten applications of 1.70 grams of ammonium metavanadate in 35 ml of hot water are used to impregnate 100 grams of clean microspheres with 6.4% V and 1.6% Ni. A batch of the clean microspheres are placed into a shallow pan; small portions of the aqueous solutions are added and mixed with the microspheres to form a paste. This paste is then dried in a convection oven at a temperature of 110° C. The resulting cake is broken-up into small chunks and more of the aqueous solution can then be applied. Because of the high solubility of nickel nitrate, the required amount of nickel can be loaded onto the microspheres with only one application of the solution; since the ammonium metavanadate has a very low solubility, many applications of this solution are needed to load vanadium at levels in excess of 0.76%.

The metals are dispersed among the microspheres in a series of conditioning steps. The metals-laden sample is first calcined at 593° C. in a muffle furnace for 1 hour and then steamed at 760° C. in a fluidized tube reactor for 4 hours. The steaming procedure for impregnated particles treated with 100% steam at 760° C. for 4 hours is described in Appendix A of the publication entitled "Engelhard Procedure for the Hydrothermal Deactivation of Fluid Catalytic Cracking Catalysts". This publication has been deposited at the Library of the Technical Information Center, Engelhard Corporation, Edison, N.J. 08818 (Dewey Decimal Number 665.533 EC/H). Access to this Library, including this publication can be obtained by writing or telephoning to the Manager of the Technical Information Center. In addition, a copy of this publication can be obtained by writing to: Director of Patents, Engelhard Corporation, Edison, N.J. 08818. The sample is then passed through a 70 mesh screen during 20 minutes on a Ro-tap sifter apparatus; this screening not only breaks apart soft agglomerates, but also removes extraneous material such as clumps of metal salts. The sample is then ready for testing.

The following examples, not to be construed as limiting, are given to further illustrate the invention.

EXAMPLE I

This example illustrates the preparation of low pore volume, macroporous fluidizable microspheres of mullite/crystalline silica from hard and soft kaolin clays and demonstrates that both types of clays can provide contact materials capable of being reactivated with boiling sulfuric acid for removal of deposited nickel and vanadium at levels of about 80% without substantial coextraction of alumina. The example further illustrates how calcination conditions alter the physical properties and response to extraction of nickel and vanadium.

ASP ®600 kaolin clay (soft kaolin clay) was slurried at 60% solids in water containing 0.3%, based on the dry clay weight, of added tetrasodium pyrophosphate dispersant. The slurry was spray dried in a Bowen nozzle spray drier. Conditions were: inlet temperature of 300°–350° C.; outlet temperature of 120°–150° C.; rear pressure 80 psig; front pressure 25 psig; feed setting 0.2 relative.

The average particle size of the microspheres was 75–85 microns in diameter.

Portions of the microspheres were calcined at temperatures between 1149° C. and 1371° C. for 2 hours in a muffle (Harrop) furnace. During calcination, the microspheres were contained in cordierite trays which were left uncovered during calcination.

The procedure was repeated with a composite of coarse reject fractions of hard Georgia clay known as Dixie clay. The coarse fractions were obtained from a plant as follows. Crude Dixie clay was blunged in water, degritted to remove plus 325 mesh oversize, and fractionated in a commercial Bird centrifuge, in conventional manner, to recover a fine particle size fraction, approximately 90% finer than 1 micron as centrifuge overflow products. The underflow products containing the so-called "coarse

TABLE I
Physical Properties of ASP 600 and Coarse Dixie Microspheres

| Exp. No. | Description of Clay Employed to Make Microspheres | Calcined Temperature °C. | Bulk Density g/cc | Total Pore Volume cc/g** | Surface Area m²/g | EAI %/sec. | Mullite Index | Cristobalite d = 4.11 A Peak Height* | Peak Width* |
|---|---|---|---|---|---|---|---|---|---|
| 238 | ASP 600 | 1149 | 1.17 | 0.239 | 7.5 | 0.62 | 16 | | |
| 239 | | 1204 | 1.26 | 0.188 | 5.5 | 0.42 | 37 | | |
| 240 | | 1260 | 1.38 | 0.134 | 2.9 | 0.22 | 52 | | |
| 241 | | 1316 | 1.43 | 0.081 | 1.6 | 0.25 | 53 | | |
| 242 | | 1371 | 1.45 | 0.037 | 1.0 | 0.20 | 58 | | |
| 254 | ASP 600 (Repeat runs) | 1149 | 1.14 | 0.248 | 8.8 | 1.00 | 7 | None Found | — |
| 255 | | 1204 | 1.21 | 0.210 | 6.9 | 0.67 | 26 | 37 | .30 |
| 256 | | 1260 | 1.32 | 0.150 | 3.9 | 0.37 | 49 | 303 | .34 |
| 257 | | 1316 | 1.42 | 0.094 | 1.8 | 0.29 | 52 | 1024 | .34 |
| 258 | | 1371 | 1.49 | 0.046 | 1.2 | 0.19 | 59 | 1414 | .30 |
| 245 | Coarse Dixie (−325 mesh) | 1149 | 1.21 | 0.204 | 7.4 | 0.74 | 14 | 14 | — |
| 246 | | 1260 | 1.40 | 0.082 | 0.5 | 1.10 | 50 | 734 | — |
| 247 | | 1371 | 1.45 | 0.017 | 0.7 | 0.59 | 54 | 894 | — |
| 248 | Coarse Dixie (78% minus 2 microns cut) | 1093 | 1.10 | 0.259 | 12.5 | 1.20 | 4 | None Found | — |
| 249 | | 1149 | 1.18 | 0.212 | 8.8 | 1.00 | 13 | 25 | .62 |
| 250 | | 1204 | 1.29 | 0.151 | 5.7 | 0.47 | 29 | 59 | .46 |
| 251 | | 1260 | 1.45 | 0.057 | 0.7 | 0.60 | 53 | 751 | .28 |
| 252 | | 1316 | 1.46 | 0.024 | 0.5 | 0.93 | 54 | 1129 | .28 |
| 253 | | 1371 | 1.49 | 0.022 | 1.5 | 0.41 | 54 | 1142 | .26 |

*Peak Height is a qualitative measure of component concentration. Peak width is a qualitative measure of degree of crystallinity.
**Determined by Hg porosimetry (volume in pores having diameters between 100 and 20,000 Angstrom units.)

TABLE II
Properties of Calcined Dixie (Hard) Clay Microspheres Before and After Reactivation with $H_2SO_4$

| | Calcination Temperature (°C.) | After Calcination | | | | After Impregnation and Reactivation with 35% $H_2SO_4$ | | | |
|---|---|---|---|---|---|---|---|---|---|
| | | Surface Area (m²/g) | Hg PV (cc/g) | EAI (%/sec.) | Mullite Index | Surface Area (m²/g) | Hg PV (cc/g) | EAI (%/sec.) | Mullite Index |
| Smpl. No. 249 | 1149 | 8.8 | 0.21 | 1.0 | 13 | 17.3 | 0.25 | 0.64 | 39 |
| Smpl. No. 250 | 1204 | 5.7 | 0.15 | 0.47 | 29 | 13.5 | 0.20 | 0.51 | 42 |
| Smpl. No. 251 | 1260 | 0.7 | 0.06 | 0.60 | 53 | 12.7 | 0.06 | 0.29 | 53 |
| Smpl. No. 252 | 1316 | 0.5 | 0.02 | 0.93 | 54 | 11.0 | 0.06 | 0.36 | 56 |
| Smpl. No. 253 | 1371 | 1.5 | 0.02 | 0.41 | 54 | 9.2 | 0.05 | 1.28 | 57 |

TABLE III
Properties of Calcined ASP 600 Microspheres Before and After Reactivation with $H_2SO_4$

| | Calcination Temperature (°C.) | After Calcination | | | | After Impregnation and Reactivation with 35% $H_2SO_4$ | | | |
|---|---|---|---|---|---|---|---|---|---|
| | | Surface Area (m²/g) | Hg PV (cc/g) | EAI (%/sec.) | Mullite Index | Surface Area (m²/g) | Hg PV (cc/g) | EAI (%/sec.) | Mullite Index |
| Smpl. No. 238 | 1149 | 7.5 | 0.24 | 0.62 | 16 | 19.6 | 0.23 | 0.57 | 34 |
| Smpl. No. 239 | 1204 | 5.5 | 0.19 | 0.42 | 37 | 17.1 | 0.18 | 0.51 | 46 |
| Smpl. No. 240 | 1260 | 2.9 | 0.13 | 0.22 | 52 | 12.3 | 0.11 | 0.24 | 42 |
| Smpl. No. 241 | 1316 | 1.6 | 0.08 | 0.25 | 53 | 10.3 | 0.07 | 0.20 | 57 |
| Smpl. No. 242 | 1371 | 1.0 | 0.04 | 0.20 | 58 | 7.8 | 0.03 | 0.18 | 58 |

TABLE IV
Extraction of V, Ni and $Al_2O_3$ by 35% $H_2SO_4$ from Microspheres Made from Dixie Clay

| Sample No. | Calcination Temperature (°C.) | Initial Metals (%) V | Ni | Final Metals (%) V | Ni | % Extraction V | Ni | $Al_2O_3$[b] |
|---|---|---|---|---|---|---|---|---|
| 249 | 1149 | 2.25 | 0.57 | 1.17 | 0.35 | 50.6 | 41.7 | 6.1 |
| 250 | 1204 | 2.30 | 0.60 | 1.03 | 0.26 | 57.6 | 50.9 | 4.6 |
| 251 | 1260 | 2.25 | 0.61 | 0.50 | 0.07 | 79.0 | 79.2 | 3.0 |
| 252 | 1316 | 2.29 | 0.63 | 0.46 | 0.05 | 81.2 | 92.6 | 2.5 |
| 253 | 1371 | 2.45 | 0.62 | 0.44 | 0.06 | 83.2 | 90.9 | 1.9 |

[b]Based on contained $Al_2O_3$ in metals free microsphere

TABLE V
Extraction of V, Ni and $Al_2O_3$ by 35% $H_2SO_4$ from Calcined ASP-600 Microspheres

| Sample No. | Calcination Temperature (°C.) | Initial Metals (%) V | Ni | Final Metals (%) V | Ni | % Extraction V | Ni | $Al_2O_3$[b] |
|---|---|---|---|---|---|---|---|---|
| 238 | 1149 | 2.34 | 0.57 | 1.07 | 0.27 | 56 | 53 | 8.2 |

TABLE V-continued

Extraction of V, Ni and Al₂O₃ by 35% H₂SO₄ from Calcined ASP-600 Microspheres

| Sample No. | Calcination Temperature (°C.) | Initial Metals (%) V | Initial Metals (%) Ni | Final Metals (%) V | Final Metals (%) Ni | % Extraction V | % Extraction Ni | % Extraction Al₂O₃[b] |
|---|---|---|---|---|---|---|---|---|
| 239 | 1204 | 2.22 | 0.60 | 0.81 | 0.16 | 64 | 71 | 6.5 |
| 240 | 1260 | 2.23 | 0.66 | 0.55 | 0.07 | 71 | 82 | 1.9 |
| 241 | 1316 | 2.13 | 0.64 | 0.40 | 0.05 | 81 | 85 | 1.3 |
| 242 | 1371 | 1.93 | 0.58 | 0.31 | 0.05 | 85 | 95 | 1.0 |
| Control A - 5% mullite | | 1.59 | 0.42 | 0.61 | 0.35 | 63 | 21 | 5.5 |
| Control B - 39% mullite | | 2.32 | 0.61 | 0.50 | 0.17 | 80 | 75 | 4.9 |

[b]Based on contained Al₂O₃ in metals free microspheres.

TABLE VI

Physical and Performance Properties of Microspheres of Calcined ASP 600 Clay vs. Calcination Temperature

| Experiment Numbers | Calcination Temperature °C. | Bulk Density g/cc | Mullite Index | Pore Volume cc/g | EAI %/sec. | Performance Agglomeration Test Mean, micron | % Leachability of Ni and V |
|---|---|---|---|---|---|---|---|
| 238 | 1149 | 1.17 | 16 | 0.239 | 0.62 | 109 | 70% or below |
| 239 | 1204 | 1.26 | 37 | 0.188 | 0.42 | 99 | |
| 240 | 1260 | 1.38 | 52 | 0.134 | 0.22 | 43 | |
| 241 | 1316 | 1.43 | 53 | 0.081 | 0.25 | 1.2 | 85%+ |
| 242 | 1371 | 1.45 | 58 | 0.037 | 0.20 | 0 | |
| Sample A (Control) | | 1.07 | 5 | 0.26 | 1.0 | * | 55 |
| Sample B (Control) | | 1.18 | 39 | 0.16 | 0.21 | * | 80 |

*Not determined at 8% metals.

rejects" were combined, screened to remove 325 mesh particles; portions of the screened suspensions were centrifuged in a pilot scale Bird centrifuge to recover a fine size fraction which was about 78% by weight finer than 2 microns and had an average particle size of about 0.4 micron. The suspensions were flocced with sulfuric acid, filtered and redispersed at about 60% solids with tetrasodium pyrophosphate prior to spray drying as described above. Portions of the spray dried microspheres were calcined as described above.

Properties of the calcined microspheres from ASP 600 clay and Dixie clay are reported in Table I.

The resulting calcined microspheres were then impregnated with 3% (wt.) metals (2.4% V and 0.6% Ni) and then reactivated.

The typical laboratory reactivation procedure consisted of weighing 50 gms of metals laden microspheres into a 100 ml round bottom flask which contained 85 gms of 35% (wt) H₂SO₄ (liquid/solid ratio of 1.7) and a magnetic stirring bar (2.5 cm length). The flask was connected to a reflux condensor and heated by means of a heating mantle to boiling. The time of leaching was measured from the onset of refluxing and typically was one hour. The slurry was stirred at the minimum speed necessary to prevent settling of the microspheres. After one hour the slurry was filtered on a medium porosity sintered glass funnel and the solids were rinsed twice with about twenty milliliters of deionized water. The reactivated microspheres were oven dried (110° C.) and subjected to analysis of the various physical properties and their residual nickel and vanadium levels.

For purposes of comparison, commercial contact material was reactivated and evaluated. This material was prepared by calcining microspheres of soft Georgia kaolin clay to undergo the exotherm and had a mullite index of 5 (Sample A). For further purposes of comparison, commercial contact material also made from soft clay but calcined to mullite index of 39 (Sample B) was also reactivated and tested. Physical properties of microspheres before and after sulfuric acid reactivation are shown in Table II (Dixie clay) and Table III (ASP 600 clay).

Metals analyses and physical properties of reactivated microspheres were measured after acid extraction in order to determine both the effectiveness of nickel and vanadium removal and possible changes in properties of the resulting reactivated microspheres that might make them unsuitable for reuse in an ART unit. The nickel and vanadium extraction results for microspheres obtained from Dixie clay and ASP 600 clay are shown in FIG. 1 and Tables IV and V.

It was found that nickel was poorly extracted (20%) from commerical contact material (control A) by refluxing 35% sulfuric acid while vanadium extraction was fairly good (63%). Extraction of vanadium and nickel from the other commercial sample (control B) was better (75% Ni and 80% V). The data for experimental samples obtained by calcining microspheres of ASP 600 clay and hard clay show that nickel extraction increases rapidly with calcination temperature over the range 1093°-1260° C. and then more slowly between 1260° C. and 1371° C. Vanadium extraction from soft clay microspheres showed virtually a linear increase with rising calcination temperature whereas the hard clay microspheres exhibited a much greater extraction increase between 1204° C. and 1260° C. calcination temperatures.

The microspheres having 39 mullite index (control B) exhibited metal extraction performance corresponding to calcination temperatures between 1204° C. and 1260° C. Furthermore, the physical properties of this contact material are comparable to those of ASP 600 clay microspheres prepared by laboratory calcination at 1204° C.

Figure 1:
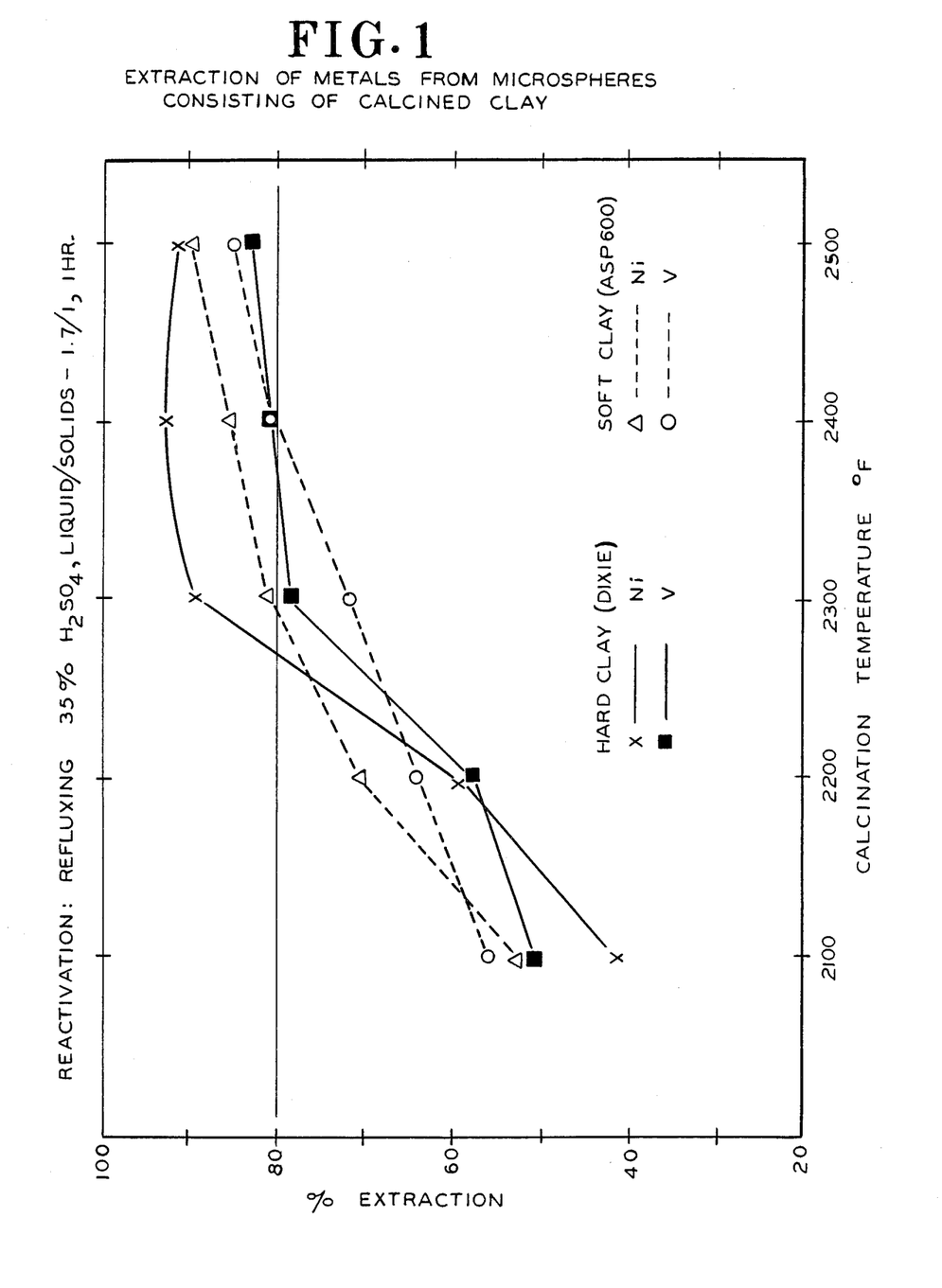
FIG. 1 is a graph correlating percent extraction of metals (nickel and vanadium) from microspheres of kaolin clay calcined in air in a muffle furnace at temperatures ranging from 2100° to 2500° F. (1149° to 1371° C.). The graph includes results using two different types of clay to form the microspheres.

The data in FIG. 1 and Tables IV and V indicated that calcination temperatures in excess of 1260° C. and 1316° C. are required for hard clay and soft clay microspheres, respectively, to attain >80% metals extraction.

The data in Tables II and III indicate that sulfuric acid reactivation has little impact on physical properties with the exception of slightly increasing the surface area. As mentioned above, a calcination temperature >1316° C. is required using microspheres obtained from the soft clay. Such calcination conditions would result in reactivated products having surface areas in the range of 10–12 m²/g. Such values are comparable to those for commercially used contact material and it is believed that they should pose few problems on recycle. If desired, however, calcination at 788°–982° C. will reduce the surface areas to the range of 4–5 m²/g.

EXAMPLE II

Samples of ASP 600 kaolin that had been spray dried and calcined in a muffle furnace at bed temperatures of 1149° C. to 1371° C. were used in tests to determine which calcined microspheres met the following desired performance criteria related to use in an ART unit: EAI<0.5%/sec., leachability of impregnated Ni+V>80% (Ni+V) with 35% $H_2SO_4$ under reflux conditions and resistance to agglomeration by the static agglomeration test below 25. The results are summarized in Table VI along with some properties. In the agglomeration testing, metals were loaded to total metals level of 8% in order to provide a means to descriminate between samples. In the leaching tests, metals were loaded at 3% total. Calcined microspheres with superior agglomeration performance, e.g., less than 25, also produced excellent metal extraction results, i.e., greater 85% of both nickel and vanadium removed.

EXAMPLE III

Catalytic properties of the microspheres of ASP 600 calcined at 1149°–1371° C. were evaluated by the MAT test. Results are summarized below.

Catalytic Properties of ASP 600 Microspheres

| Exp. No. | Calcined Temperature °C. | Hydrogen % | Conversion % | Coke % |
|---|---|---|---|---|
| 238 | 1149 | 0.02 | 5.92 | 0.71 |
| 239 | 1204 | 0.02 | 4.66 | 0.60 |
| 240 | 1260 | 0.01 | 3.26 | 0.37 |
| 241 | 1316 | 0 | 5.37 | 0.3 |
| 242 | 1371 | 0 | 2.17 | 0.16 |

EXAMPLE IV

Preparation of Microspheres from Raw Kyanite

A sample of raw (uncalcined) high purity kyanite was obtained from Virginia Kyanite Co. The sample as received had the following composition: L. O. I.—0.34%

| | |
|---|---|
| $Al_2O_3$ - 57.93% | $TiO_2$ - 0.93% |
| $SiO_2$ - 40.69% | CaO - 0.02% |
| $Fe_2O_3$ - 1.0% | MgO - 0.04% |
| $K_2O$ - 0.02% | $Na_2O$ - 0.09% | and was about 90%<325 mesh.

This material was ball milled 20 hours at 60% solids with 0.3% Calgon T dispersant added; Agates were used as the grinding media at 5.6 times weight of kyanite. The solids in the resultant slurry, pH 7.5, had a particle size distribution as below:

| | |
|---|---|
| 85% < 4 u | 35 < 1 u |
| 77% < 3 u | 60 < 2 u |

The sample was spray dried with approximately 50% loss. Furthermore, the recovered product did not have the appearance of microspheres.

A second preparation was made as above except sodium silicate was added as binder to spray drier feed. The addition level for "N ®" Brand sodium silicate was 1% based on the weight of the kyanite. The spray dryer product was calcined at two temperatures as below:

| | | |
|---|---|---|
| Calcination Temp. (Pereny Furnace) | 1149° C. | 1260° C. |
| Time at Temp. | 1 hour | 1 hour |
| Product | | |
| Hg Pore Volume (cc/g) | 0.202 | 0.22 |
| BET Surface Area ($N_2$) (m²/g) | 2.1 | 1.9 |
| Mullite Index | not meaningful - interfering peaks | 59 |
| EAI (%/sec.) | 0.58 | 0.76 |
| Av. Particle Size (microns) | 88 | 70 |

The sample calcined at 1260° C. was impregnated with 0.6% Ni, 2.4% V by the aqueous impregnation procedure, followed by steaming at 760° C., 4 hours. The sample was extracted with refluxing 20% $H_2SO_4$ for 1 hour (liquid/solid weight ratio of 2/1) to yield 92.5% nickel removal and 91.8% vanadium removal but only 0.9% $Al_2O_3$ coextraction (based on the $Al_2O_3$ content of the mircospheres.)

Larger quantities of calcined kyanite from the above spray drier batch were prepared with the following properties.

| | | |
|---|---|---|
| Calcination Temp. (Harrop Furnace) | 1038° C. | 1149° C. |
| Time at Temp. | 1 hour | 1 hour |
| Hg P. Volume (cc/gm) | 0.26 | 0.23 |
| Mullite Index | (not meaningful - interfering peaks) | |
| EAI (%/sec.) | 3.3 | 1.0 |

These samples were evaluated for agglomeration. When loaded to 3% metals both samples agglomerated severely.

A third preparation of kyanite microspheres was prepared by first fluid energy milling the raw material. This was done in a pilot plant fluid energy mill at the following settings:
High pressure steam—110-125 psig
Super Heaters—315° C. on both
Feed Rate—32#/Hour
Feed Pressure—80-90 psig
Grind Pressure—75-85 psig The fluid energy milled product was subsequently ball milled 20 hours, as before, to yield a slurry of average particle size 1.5 microns.

The ball mill product was treated with "N" Brand sodium silicate (3% based on kyanite weight) and spray dried. The spray drier settings were:
Slurry Feed Rate—0.2 relative
Slurry Feed Pressure—35 psig
Air Pressure—80 psig
Inlet Temp.—177° C.
Outlet Temp.—52°-57° C.

The spray drier product was calcined in the Harrop furnace to give the following properties:

| | |
|---|---|
| Calcination Temp. | 1260° C. |
| Time at Temp. | 1 hour |
| Hg P. Volume (cc/gm) | 0.27 |
| BET Surface Area (m²/g) | 1.5 |
| EAI (%/sec.) | 1.4 |

Larger quantities of calcined kyanite were prepared for agglomeration evaluation. These samples were prepared from microspheres prepared using 3% sodium silicate binder. The only differences between these samples and the previous ones were the increased residence time in the furnace and the higher level of sodium silicate added as binder. Portions of the calcined microspheres were tested for physical properties. Others were impregnated by the water impregnation technique described above to a total metal loading of 5% and tested for agglomeration performance. Results are summarized below:

Kyanite Microspheres

| Calcination Conditions (°C./Hours) | 1148° C./2 | 1260° C./2 | 1371° C./2 |
|---|---|---|---|
| Agglomeration, 5% metals | | | |
| Δ mean (micron) | 69.3 | 4.9 | 5.7 |
| Δ median (micron) | 54.7 | 4.9 | 5.5 |
| Physical Properties, Clean Microspheres | | | |
| Mullite index | 0* | 47 | 74 |
| Hg Pore Volume, cc/g | 0.2667 | 0.2713 | 0.2834 |
| Mean Pore Radius, Angstrom | 3500 | 4400 | 5300 |
| Surface Area, m²/g | 2.0 | 1.7 | 1.3 |

*Interfering Peaks - value may not be meaningful.

EXAMPLE V

This example illustrates the preparation of fluidizable microspherical contact material from mixtures of high purity kaolin clay with various calcined and hydrous aluminas. The clay materials used were ASP 600 kaolin clay, described above, and hard kaolin clay having a nominal particle size of about 80% minus 2 microns and prepared, as described above, by centrifuging a degritted waste stream of coarse particle size fraction of hard clay and recovering the fine size fraction. The aluminas were Alcoa A-3 alumina (calcined alumina); and FGA (fusion grade calcined alumina) and TGA, (transition grade alumina) aluminas obtained from Reynolds Metals Company. The proportion of aluminas mixed with clay was varied, ranging from about 15 to 75 parts by weight alumina (anhydrous basic) to 100 parts by weight total mixture (dry weight basis).

The procedure for preparing contact material composed of clay-alumina blends was as follows. An amount of tetrasodium pyrophosphate corresponding to 0.5 wt.% of the clay component of the blends was added to water. The pH of the solution of tetrasodium pryophyosphate, initially about 9.8, was then adjusted to 7.0 by addition of concentrated phosphoric acid. Mixtures of clay and alumina were added to the resulting solution in amounts calculated to produce 60% solids slurries. Slurry makedown was performed in a Cowles mixer. The slurries were then spray dried in a Stork-Bowen spray dryer. The operating conditions of the spray dryer were: inlet temperature 250°-260° C., outlet temperature 110°-120° C., nozzle pressure 35 psig, and pressure drop 6-7 in. of water. Five hundred (500) g of each sample was calcined in the Harrop furnace at two different temperatures (1260° C. and 1371° C.) for two hours.

Physical properties were measured and some calcined microspheres were impregnated with metals and tested for extractability with acid and agglomeration. These results are presented in Table VII. X-ray diffraction patterns indicated that little if any mullite formed beyond that expected from the clay component even with the 1371° C. calcinated treatment.

EXAMPLE V

Samples of agglomerates from a commercial ART unit were obtained after unit shutdowns. The contact materials used in this operation were produced by spray drying a dispersed slurry of soft Georgia kaolin clay to form microspheres and calcining the microspheres through the characteristic exotherm. These microspheres had mullite indexes in the range of 5 to 10.

Chemical and physical properties of agglomerates were made and SEM analyses were performed. Those samples and their properties are summarized below.

| Sample Identification | Description and Location |
|---|---|
| A | 1-2 inch size orange chunks, irregular shaped, from burner |
| B | 1-2 inch size orange chunks, irregular shaped, from burner |
| C | 8-10 inch orange brown, brick-like shape, from top of cyclone from burner. |

SEM studies of the agglomerates provide information on the method of binding of the microspheres. Vanadium, sodium and the trace impurity calcium were found to be present along with a high silica content aluminosilicate in Sample A. Sample B was very similar. The other sample (C) obtained from the burner also contains silica and vanadium rich binding material. Sodium oxide levels in the binding material were lower. The binding material in this sample also was composed predominately of a high silica aluminosilicate.

Analyses of agglomerates from a commercial ART Process unit reflect the diverse nature of possible binding agents. However, the predominant components are mainly silica, sodium and vanadium rich crystalline phases.

EXAMPLE VI

The pore size distributions (mercury) for calcined clay microspheres (from EXAMPLE I) and control samples A and B are presented in Table VIII. The preferred microspheres, which have excellent metals extraction properties and low agglomeration tendencies, exhibit low total pore volumes and contain predominately pores with diameters greater than 1000Å. Nitrogen pore size distribution measurements also indicate that the prefered microspheres contain little or no micropore volume.

TABLE VIII

| Sample/ Diameter Å | Pore Volume, cc/g | | | | |
|---|---|---|---|---|---|
| | 100-600 | 600-1000 | 1000-2000 | 2000-20000 | Total |
| 238 | 0.036 | 0.067 | 0.130 | 0.006 | 0.239 |
| 239 | 0.022 | 0.039 | 0.128 | 0.000 | 0.188 |
| 240 | 0.016 | 0.018 | 0.093 | 0.007 | 0.134 |
| 241 | 0.012 | 0.011 | 0.055 | 0.006 | 0.084 |
| 242 | 0.013 | 0.007 | 0.015 | 0.002 | 0.037 |
| 254 | 0.028 | 0.068 | 0.150 | 0.003 | 0.249 |

TABLE VIII-continued

| Sample/ | Pore Volume, cc/g | | | | |
|---|---|---|---|---|---|
| Diameter Å | 100–600 | 600–1000 | 1000–2000 | 2000–20000 | Total |
| 255 | 0.018 | 0.046 | 0.141 | 0.006 | 0.210 |
| 256 | 0.011 | 0.034 | 0.101 | 0.002 | 0.148 |
| 257 | 0.004 | 0.015 | 0.069 | 0.004 | 0.092 |
| 258 | 0.003 | 0.010 | 0.031 | 0.002 | 0.046 |
| Sample B | 0.007 | 0.016 | 0.101 | 0.055 | 0.179 |
| Sample A | 0.020 | 0.035 | 0.144 | 0.047 | 0.246 |

TABLE VII

Contact Material Prepared from Mixtures of Clay and Alumina

| | Sample Description Parts by wt Al$_2$O$_3$/ | Physical Properties Fresh Material | | | | | | Catalytic (MAT) Results | | |
|---|---|---|---|---|---|---|---|---|---|---|
| No. | Parts by wt Clay | Calc °C. | B.D. g/cc | P.V. cc/g | S.A. m$^2$/g | EAI %/sec | Mullite Index | H$_2$ | Conv. | Coke |
| 200 | 14.2 Alcoa A-3/85.8 ASP 600 | 1371 | 1.55 | .095 | 1.9 | 0.11 | 59 | 0 | 2.75 | 0.33 |
| 213 | | 1260 | 1.40 | .156 | 4.2 | 0.30 | 42 | 0.01 | 3.84 | 0.55 |
| 201 | 30.0 Alcoa A-3/69.7 ASP 600 | 1371 | 1.31 | .195 | 3.5 | 0.34 | 52 | 0 | 2.90 | 0.49 |
| 214 | | 1260 | 1.22 | .251 | 5.6 | 0.45 | 32 | 0.02 | 4.02 | 0.66 |
| 202 | 46.6 Alcoa A-3/53.4 ASP 600 | 1371 | 1.25 | .246 | 4.0 | 0.42 | 43 | 0 | 3.37 | 0.55 |
| 215 | | 1260 | 1.15 | .304 | 6.3 | 0.67 | 25 | 0.02 | 4.70 | 0.82 |
| 203 | 72.3 Alcoa A-3/27.7 ASP 600 | 1371 | 1.17 | .325 | 4.9 | 0.92 | 21 | | | |
| 216 | | 1260 | 1.09 | .373 | 7.2 | 1.2 | 10 | 0.02 | 4.55 | 0.76 |
| 204 | 14.2 Alcoa A-3/85.8 Hard | 1371 | 1.50 | .071 | 1.1 | 0.14 | 59 | 0 | 1.96 | 0.27 |
| 217 | Clay | 1260 | 1.36 | .148 | 2.6 | 0.34 | 45 | 0.01 | 3.01 | 0.50 |
| 205 | 30.3 Alcoa A-3/69.7 Hard | 1371 | 1.39 | .159 | 2.4 | 0.34 | 51 | 0 | 2.41 | 0.38 |
| 218 | Clay | 1260 | 1.28 | .213 | 3.9 | 0.34 | 35 | 0 | 2.96 | 0.71 |
| 206 | 46.6 Alcoa A-3/53.4 Hard | 1371 | 1.29 | .243 | 3.5 | 0.43 | 38 | 0 | 3.10 | 0.60 |
| 219 | Clay | 1260 | 1.18 | .292 | 5.5 | 0.51 | 24 | 0.02 | 4.27 | 0.77 |
| 207 | 72.3 Alcoa A-3/27.7 Hard | 1371 | 1.18 | .312 | 4.0 | 0.85 | 13 | | | |
| 220 | Clay | 1260 | 1.09 | .372 | 6.2 | 1.3 | 8 | 0.02 | 5.26 | 0.76 |
| 208 | 30.3 Ball A-3/69.7 ASP 600 | 1371 | 1.33 | .200 | 3.1 | 0.25 | 53 | 0 | 2.87 | 0.44 |
| 221 | Milled | 1260 | 1.22 | .255 | 4.7 | 0.39 | 36 | 0.01 | 3.95 | 0.70 |
| 209 | 46.6 Ball A-3/53.4 ASP 600 | 1371 | 1.22 | .274 | 4.1 | 0.38 | 42 | 0.01 | 4.69 | 0.65 |
| 222 | Milled | 1260 | 1.14 | .309 | 5.8 | 0.67 | 25 | 0.01 | 4.06 | 0.76 |
| 210 | ASP 600 (Control) | 1371 | 1.51 | .047 | 0.7 | 0.27 | 58 | 0 | 2.43 | 0.16 |
| 223 | | 1260 | 1.40 | .139 | 3.3 | 0.35 | 46 | 0.01 | 3.05 | 0.54 |
| 211 | 46.6 Reynolds FGA/53.4 | 1371 | 1.47 | .139 | 1.4 | 0.33 | 42 | 0 | 3.06 | 0.32 |
| 224 | (ASP 600) | 1260 | 1.08 | .338 | 11.3 | 0.94 | 28 | 0.04 | 6.06 | 1.09 |
| 212 | 46.6 Reynolds TGA/53.4 | 1371 | 1.46 | .146 | 1.6 | 0.47 | 39 | 0 | 2.36 | 0.33 |
| 225 | (ASP 600) | 1260 | 1.07 | .347 | 12.3 | 1.0 | 23 | 0.04 | 6.74 | 1.20 |

| | Sample Description Parts by wt Al$_2$O$_3$/ | Performance Properties with 8% metals | | | | | | | | |
|---|---|---|---|---|---|---|---|---|---|---|
| | | Metals Extraction 17% HCL L/S - 3/1 | | | | Metals Extraction 35% H$_2$SO$_4$ L/S = 5/1 | | | | Agglomera- |
| No. | Parts by wt Clay | V | Ni | V + Ni | Al$_2$O$_3$ | V | Ni | V + Ni | Al$_2$O$_3$ | tion |
| 200 | 14.2 Alcoa A-3/85.8 ASP 600 | 95 | 98 | 96 | 2.4 | 85 | 98 | 87 | 2.8* | 5 |
| 213 | | 92 | 96 | 93 | 4.6 | 86 | 96 | 88 | 6.0 | 46 |
| 201 | 30.0 Alcoa A-3/69.7 ASP 600 | 95 | 98 | 96 | 2.1 | 95 | 75 | 91 | 2.4 | 61 |
| 214 | | 93 | 96 | 94 | 3.1 | 93 | 96 | 94 | 3.7 | 80 |
| 202 | 46.6 Alcoa A-3/53.4 ASP 600 | 89 | 97 | 92 | 1.3 | 76 | 97 | 80 | 1.5* | 28 |
| 215 | | 94 | 95 | 94 | 0.8 | 94 | 94 | 94 | 2.1 | 27 |
| 203 | 72.3 Alcoa A-3/27.7 ASP 600 | 96 | 97 | 96 | 0.6 | 72 | 97 | 77 | 0.6* | 24 |
| 216 | | 95 | 96 | 95 | 0.6 | 95 | 95 | 95 | 0.6 | 7 |
| 204 | 14.2 Alcoa A-3/85.8 Hard | 95 | 98 | 95 | 2.8 | 92 | 98 | 93 | 3.5 | 21 |
| 217 | Clay | 91 | 97 | 92 | 3.0 | 92 | 97 | 92 | 3.9 | 63 |
| 205 | 30.3 Alcoa A-3/69.7 Hard | 92 | 98 | 93 | 2.1 | 79 | 97 | 83 | 2.5* | 22 |
| 218 | Clay | 92 | 97 | 93 | 2.7 | 92 | 97 | 93 | 3.2 | 42 |
| 206 | 46.6 Alcoa A-3/53.4 Hard | 94 | 96 | 94 | 1.4 | 75 | 95 | 79 | 1.5* | 12 |
| 219 | Clay | 93 | 95 | 93 | 1.2 | 93 | 95 | 93 | 1.6 | 28 |
| 207 | 72.3 Alcoa A-3/27.7 Hard | 96 | 97 | 96 | 0.6 | 95 | 94 | 95 | 0.6 | 28 |
| 220 | Clay | 95 | 95 | 95 | 0.6 | 96 | 96 | 96 | 0.6 | 13 |
| 208 | 30.3 Ball A-3/69.7 ASP 600 | 97 | 98 | 97 | 2.0 | 97 | 98 | 97 | 2.5 | 79 |
| 221 | Milled | 92 | 92 | 92 | 2.5 | 92 | 96 | 93 | 3.0 | 112 |
| 209 | 46.6 Ball A-3/53.4 ASP 600 | 97 | 98 | 97 | 1.4 | 90 | 97 | 91 | 1.7 | 88 |
| 222 | Milled | 93 | 95 | 93 | 1.8 | 94 | 95 | 94 | 2.1 | 56 |
| 210 | ASP 600 (Control) | 95 | 98 | 96 | 3.4 | 94 | 98 | 94 | 4.1 | 1 |
| 223 | | 94 | 97 | 95 | 3.2 | 95 | 97 | 96 | 3.8 | 14 |
| 211 | 46.6 Reynolds FGA/53.4 | 94 | 98 | 95 | 1.9 | 94 | 97 | 95 | 2.2 | 27 |
| 224 | (ASP 600) | 90 | 90 | 90 | 3.1 | 91 | 87 | 90 | 4.1 | 96 |
| 212 | 46.6 Reynolds TGA/53.4 | 95 | 97 | 95 | 2.0 | 93 | 97 | 94 | 2.3 | 26 |
| 225 | (ASP 600) | 90 | 87 | 89 | 3.4 | 91 | 87 | 90 | 4.8 | 85 |

*L/S - 3/1 for this H$_2$SO$_4$ extraction
*35% H$_2$SO$_4$ L/S = 3

We believe that attrition-resistant mullite/crystalline silica microsphere of the invention will have utility in processes other than selective vaporization. The mullite/cystalline silica material can be employed along with particles of active cracking catalyst in practice of the catalyst make up policy described in the U.S. Pat. No. 4,289,605 to Bartholic. The process involves adding controlled proportions of both an active cracking catalyst and a substantially catalytically inert, large pore solid to replace the amount of catalyst withdrawn from the inventory of a continuous cracking unit operating with metal contaminated feed. The content of U.S. Pat. No. 4,289,605 are incorporated herein by cross-reference. We also believe that the contact materials of the present invention can be blended with particles of active cracking catalyst particles, particularly highly active fluidizable cracking catalysts, to adjust activity and selectivity to desired levels. In particular, we believe the new contact material will minimize coke and hydrogen formation when blended with active zeolite cracking catalyst particles to adjust activity and also that the known adverse effect of vanadium contamination on zeolite stability will be minimized by the presence of silica in crystalline form rather than more-reactive non-crystalline form. The particles of mullite/crystalline silica can also be preblended with particles of active cracking catalyst, for example, those containing rare earth and/or hydrogen form crystalline zeolites such as those having the crystal structure of faujasite in a matrix of silica-alumina or the like, and used in short contact time riser FCC operations. The relative proportions of particles of active cracking catalyst and particles of mullite/crystalline silica are subject to variation, depending on the activity and selectivity of the active cracking catalysts, the desired activity and selectivity desired in the cracking unit and the possible presence of other blending particles, such as, for example particles of cerium impregnated on alumina to reduce the content of SOx in regenerator flue gas. Generally, proportions vary from 90:10 10:90 parts active cracking catalyst to particles of mullite/crystalline silica. When cracking catalysts of exceptionally high activity are used, for example the novel high zeolite-content cracking catalysts described in European Patent Application No. 84101946.6, additive particles comprising mullite/crystalline silica would be used in major weight amount. When other blending particles, such as cerium impregnated on alumina, are also present, the high zeolite-content cracking catalysts usually will account for a minor weight of the total blend mixture of particles.

We claim:

1. In a process for preparing premium products from a charge of petroleum hydrocarbon feedstock having a substantial Conradson Carbon residue number and metals content including vanadium and nickel which comprises contacting said feedstock in a decarbonizing and demetallizing zone with fluidizable microspheres of solid contact material having a low microactivity for catalytic cracking at low severity, including a temperature of at least 482° C., for a period of time less than that which induces substantial thermal cracking of said feedstock, at the end of said period of time separating from said microspheres of solid contact material a decarbonized volatilized hydrocarbon fraction of reduced Conradson Carbon residue number and metals content as compared with said feedstock; reducing temperature of said separated fraction to a level below that at which substantial thermal cracking takes place; subjecting said microspheres of solid contact material to contact with air at elevated temperature in a separate burning zone to remove combustible deposit from said solid and heat the solid; recycling at least a portion of said microspheres of solid contact material from the burning zone to the decarbonizing and demetallizing zone for further decarbonizing and demetallizing of said feedstock; the improvement which comprises employing in said process dense attrition resistant, acid insoluble microspheres consisting essentially of mullite crystals and crystals of a material selected from the group consisting of cristobalite, tridymite and mixture thereof, said microspheres having a mullite index of at least 45, an EAI below 1%/sec., a surface area below 5 m$^2$/g, a total porosity in the range of 0.01 to 0.09 cc/g and a pore structure such that the majority of the pores are larger than 1000 Angstrom units in diameter, said microspheres having been obtained by calcining microspheres consisting essentially of a material selected from the group consisting of kaolin clay, a mixture of kaolin clay and alumina, and kyanite at a temperature in excess of 1260° C.

2. The process of claim 1 further characterized in that said microspheres have a resistance to agglomeration below about 25 when tested by the static agglomeration test method hereinabove described at a metals loading of 8 weight % nickel plus vanadium, and a vanadium/nickel weight ratio of 4/1.

3. In a process for preparing premium products from a charge of petroleum hyrocarbon feedstock having a substantial Conradson Carbon residue number and metals content including vanadium and nickel which comprises contacting said feedstock in a decarbonizing and demetallizing zone with fluidizable microspheres of solid contact material having a low microactivity for catalytic cracking at low severity, including a temperature of at least 482° C., for a period of time less than that which induces substantial thermal cracking of said feedstock, at the end of said period of time separating from said microspheres of solid contact material a decarbonized volatilized hydrocarbon fraction of reduced Conradson Carbon residue number and metals content as compared with said feedstock; reducing temperature of said separated fraction to a level below that at which substantial thermal cracking takes place; subjecting said micropheres of solid contact material to contact with air at elevated temperature in a separate burning zone to remove combustible deposit from said solid and heat the solid; recycling at least a portion of said microspheres of solid contact material from the burning zone to the decarbonizing and demetallizing zone for further decarbonizing and demetallizing of said feedstock; the improvement which comprises employing in said process dense attrition resistant, acid insoluble microspheres consisting essentially of mullite crystals and crystals of a material selected from the group consisting of cristobalite, tridymite and mixture thereof, said microspheres having a mullite index of at least 45, an EAI below 1%/sec., a surface area below 5 m$^2$/g, a total porosity in the range of 0.01 to 0.09 cc/g and a pore structure such that the majority of the pores are higher than 1000 Angstrom units in diameter, said microspheres having been obtained by calcining microspheres consisting essentially of a material selected from the group consisting of kaolin clay, a mixture of kaolin clay and alumina, and kyanite at a temperature in excess of 1260 C.; and at least periodically withdrawing an additional portion of said microspheres from said burning zone and contacting them with a solution of mineral acid to extract nickel and vanadium therefrom without substantial co-extraction of alumina from said microspheres and without appreciably changing the size and hardness thereof, and reintroducing at least a part of the microspheres thus extracted into said burning zone for subsequent reintroduction to said decarbonizing and demetallizing zone.

4. The process of claim 3 wherein said acid is sulfuric acid.

5. The process of claim 4 wherrein vanadium and nickel are extracted at elevated temperature.

6. The process of claim 3 wherein said acid is sulfuric acid containing added monoperoxysulfuric acid to oxidize vanadium to V+5 and vanadium is recovered from the extract by liquid ion exchange or precipitation.

7. The process of claim 3 wherein said acid is hydrochloric acid.

8. The process of claim 7 wherein vanadium and nickel are extracted at elevated temperature.

9. The process of claim 3 wherein at least 80% of the nickel and at least 80% of the vanadium are extracted.

10. The process of claim 3 wherein said nickel and vanadium are extracted with said solution of mineral acid without previously being subjected to any pretreatment to facilitate extraction of nickel or vanadium with mineral acid other than burning in air to remove residual carbon and to oxidize vanadium to the pentavalent valence state.

11. The process of claim 3 wherein said particles of fluidizable contact material are derived from kaolin clay.

12. The process of claim 3 wherein said particles are derived from kyanite.

13. The process of claim 3 wherein said particles are derived from a mixture of clay and alumina.

14. The process of claim 3 wherein the pores in said particles are predominantly larger than 1000 Angstrom units in diameter and the particles are substantially free from pores smaller than 100 Angstrom units.

15. The process of claim 3 wherein said particles are in the form of fluidizable microspheres the EAI of which is below 0.5%/sec. before and after extraction of nickel and vanadium.

16. The process of claim 3 wherein th particles of contact material are separated from the acid extract by filtration or the like and the filtrate has a pH in the range of 0.3 to 1.

17. The process of claim 3 wherein substantially all vanadium in the particles withdrawn for extraction of vanadium and nickel with mineral acid is converted to pentavalent vanadium either before, during or after extraction with acid.

* * * * *